Oct. 5, 1948. P. P. JOHNSON 2,450,803
METHOD OF MAKING SHEATHED VALVES
Original Filed Jan. 24, 1942
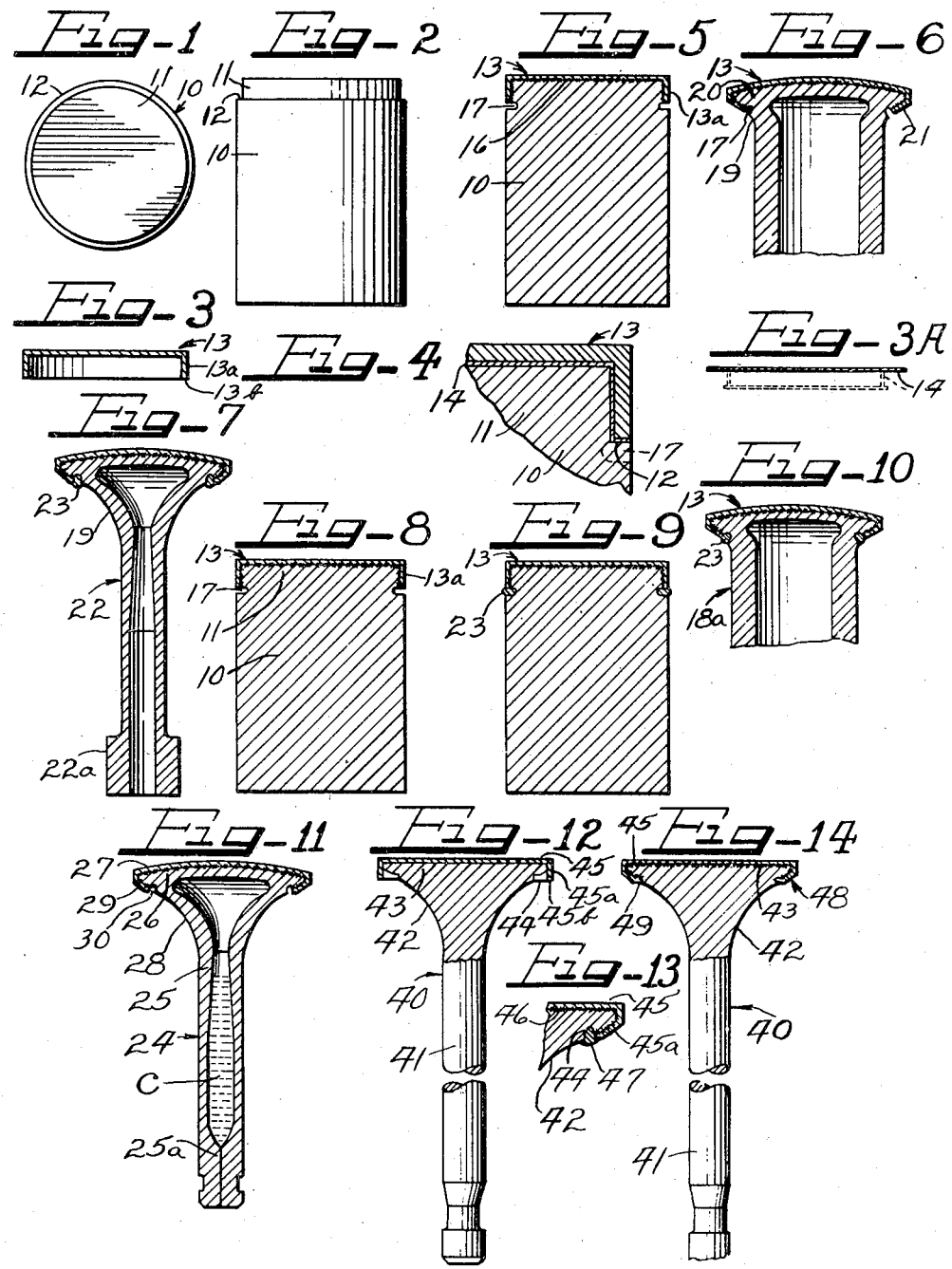
INVENTOR
Paul P. Johnson Patented Oct. 5, 1948

2,450,803

UNITED STATES PATENT OFFICE 2,450,803

METHOD OF MAKING SHEATHED VALVES

Paul P. Johnson, Willoughby, Ohio, assignor to Thompson Products, Inc., a corporation of Ohio Original application January 24, 1942, Serial No. 428,135. Divided and this application February 14, 1944, Serial No. 522,260

4 Claims. (Cl. 29—156.7)

This invention relates to methods for making headed articles such as poppet valves having a sheath affixed to the head for protecting the same against corrosion and heat.

Specifically, the invention relates to a method of making poppet valves with a thin sheet of corrosion and heat-resistant material covering the valve head and extending along the under side of the valve head to provide a valve seat, together with a metal bond integrally affixing the sheath to the valve head, and a puddled-in bead of weld material sealing the bond metal.

This application is a division of my copending application entitled "Sheathed valve," Serial 428,135, filed January 24, 1942, now U. S. Patent No. 2,403,926, granted July 16, 1946.

According to this invention the main valve body is made from metal such as steel which has desirable forging, machining and strength characteristics. Frequently, however, such steels will not stand up in operation due to the hot corrosive atmosphere to which the valve heads are subjected. For example, exhaust valves in high speed, high compression engines operated with very high octane gasoline are subjected to tremendous abuse since the hot corrosive gases must flow past the valve to the exhaust manifold. In order to protect the head area of such valves, corrosion-resistant metals have been proposed but these metals are very expensive and frequently do not have the machinability and strength characteristics necessary for the valve body. According to this invention, therefore, the valve body itself is made of the usual machinable and workable metal such as steel and the valve head is covered with a sheath of corrosion and heat-resistant metal such as a nickel-chromium alloy. The sheath is integrally affixed to the head area of the valve as by brazing and extends over the peripheral edge of the valve head to underlap the valve head and define a valve head seat. The sheath can be made from forged or wrought metal and thus is more perfect than puddled-on metal which is prone to shrinks, blow holes and segregation.

The braze bond between the sheath and valve body improves heat flow from the exposed surface of the operating valve thereby minimizing burning of the valve.

It is, then, an object of this invention to provide methods of making headed articles with sheaths for the heads to protect the heads against deterioration by surrounding atmosphere.

A further object of the invention is to provide a simple and inexpensive method of producing poppet valves with sheathed heads.

A further object of the invention is to provide a method of producing sheathed valve heads by capping the billet from which the valve body is formed.

Another object of the invention is to provide a method of making hollow poppet valves with sheathed hollow heads wherein the billet from which the valve is formed is modified in form to receive a corrosion resistant metal cap and wherein a brazing metal shim between the cap and billet is used to bond the cap and billet together.

Another object of the invention is to provide a method for producing poppet valves having the heads thereof clad with a sheath of corrosion resistant metal, which method involves the integral joining of the sheath metal with the valve body metal through the media of a first bond and wherein this first bond is sealed by means of a second bond.

Other and further objects of the invention will be apparent to those skilled in the art from the following detailed description of the annexed sheet of drawings which, by way of preferred examples, shows several embodiments of the invention. It will be understood, however, that the invention is not limited to the illustrated embodiments.

On the drawings:

Figure 1 is a top plan view of a metal billet useful according to this invention to provide the body of a hollow valve.

Figure 2 is a side elevational view of the billet shown in Figure 1.

Figure 3 is a vertical cross-sectional view of a metal cap for the billet of Figures 1 and 2.

Figure 3A is a transverse cross-sectional view of a brazing shim disk used to form the bond between the sheath and valve body and illustrating in dotted lines the manner in which the shim is cupped to cover all of the surfaces to be brazed together.

Figure 4 is a greatly enlarged fragmentary cross-sectional view of the cap and billet illustrating the mating surfaces thereof prepared for a brazing operation.

Figure 5 is a vertical cross-sectional view of the billet of Figures 1 and 2 having the cap of Figure 3 brazed thereon and having a groove in the side wall thereof at the terminal end of the cap.

Figure 6 is a fragmentary vertical cross-sectional view illustrating a step in the method of forging a poppet valve from the capped billet of Figure 5.

Figure 7 is a vertical cross-sectional view of a hollow sheathed poppet valve body prepared from the blank of Figure 6 and having a welded bead seated in the groove of the blank to seal the brazed metal bond.

Figure 8 is a view similar to Figure 5 but illustrating the billet as being grooved prior to the brazing operation in accordance with a modified process accordng to this invention.

Figure 9 is a vertical cross-sectional view of the billet and cap shown in Figure 8 illustrating the same in brazed-together relation and also illustrating the welded-in bead sealing the brazed bond.

Figure 10 is a view similar to Figure 6 but illustrating the welded-in seal as being applied to the valve blank before it is completely formed into a valve in accordance with the modified process of this invention.

Figure 11 is a vertical cross-sectional view of a finished hollow poppet valve made either from the process illustrated in Figures 1 to 7 or Figures 8 to 10.

Figure 12 is a fragmentary side elevational view, with parts broken away and shown in vertical cross section of a solid poppet valve having a cap with a depending rim flange disposed over the valve head.

Figure 13 is a fragmentary vertical cross-sectional view of a portion of the valve head shown in Figure 12 but illustrating the rim flange of the cap as being spun inwardly to underlap the valve head and also illustrating a welded-in bead protecting the bonding metal between the cap and valve head.

Figure 14 is a view similar to Figure 12 but illustrating the finished sheathed valve head.

As shown on the drawings:

In Figures 1, 2 and 5 the reference numeral 10 designates a solid cylindrical metal billet or slug having a reduced diameter head portion 11 at one end thereof. An annular shoulder 12 is thus provided at the base of the reduced portion 11. The length of the reduced portion 11 is determined by the type of valve being made so that the metal in the reduced portion will form the valve head.

The billet 10 is composed of metal such as an alloy steel which has desirable mechanical properties so that it can be machined, forged, and extruded to produce a hollow poppet valve body.

As best shown in Figure 3 a hollow circular cap 13 is provided for the reduced portion 11 of the billet. This cap 13 can be formed by machining from a bar or can be stamped from sheet stock. The metal of the cap is selected for corrosion and heat-resistant properties. A suitable alloy for this purpose is a metal composed of 80% nickel and 20% chromium. Such an alloy is highly resistant to heat and corrosion.

The cap 13 has a cylindrical dependent side wall 13a for snugly engaging the side wall of the reduced portion 11 of the billet. The side wall 13a terminates in a rim edge 13b adapted to seat on the shoulder 12 of the billet.

As shown in Figure 3A, and in accordance with this invention, a thin disk 14 of copper, silver or any suitable brazing metal or alloy is used to form the braze bond between the cap 13 and the billet portion 11. The disk 14 is centered over the billet portion 11 and the cap 13 is then pressed onto the billet thereby cupping the disk to the form shown in dotted lines. Alternately, of course, the cup could be preformed to fit on the billet and in the cap.

The cap 13 fits snugly on the billet 10 around the head 11 thereof so that the shim 14 is between all mating surfaces of the cap and billet as shown in Figure 4.

Any suitable bonding alloy having a melting point at or below the forging temperatures of the cap and billet metals can be used. Alternately, the bonding metal could be electroplated in the cap 13 and on the billet portion 11 as an integral film instead of as a separate shim.

The billet 10 and cap 13 with the shim 14 therebetween is next heated in a furnace preferably in a non-oxidizing atmosphere such as a hydrogen atmosphere to form a brazed bond 16 between all mating surfaces of the cap and billet as shown in Figure 5. The cap is thus integrally brazed to the billet.

In accordance with one embodiment of this invention the billet with the cap brazed thereon next has a peripheral groove 17 cut therein at the exposed bond area between the cap and billet adjacent the rim edge 13b of the cap. As hereinafter explained this groove 17 is provided to form a pocket for a bead of welding metal having the same composition as either the cap or the billet to seal the brazed bond.

The billet 10 with the cap 13 brazed thereon is next die pressed and extruded around a stake to provide a hollow valve blank 18 as shown in Figure 6. The valve blank 18 has an outwardly flaring neck portion 19 containing the groove 17 and a head portion 20 covered with the cap 13. The die pressing operation deforms the billet metal to provide the head 20 and also deforms the cap metal so that the flange 13a thereof will underlap the head and partially cover the neck portion 19 as at 21. This underlapping portion 21 is adapted to provide a seat for the head of the finished valve. The die pressing or forging is preferably carried out at elevated temperatures close to the brazing temperature and improves the braze bond 16. Thus any flaws in the bond are corrected.

As shown in Figure 7 the blank 18 of Figure 6 is further forged and coined to provide a valve body 22 having a hollow head portion and hollow stem portion with an enlarged nubbin end 22a. The groove 17 in the neck portion 19 of the valve body is next filled with welding material 23 of the same or similar composition as either the billet metal 10 or the cap metal 13. The weld metal 23 can be puddled into the groove 17 and will completely seal all exposed bonding metal between the cap and valve body. The bonding metal is less corrosion resistant than the sheath metal or valve body metal and it is thus highly desirable to seal the bond against exposure to corroding atmospheres. A bead of the welding metal will project as a rim around the neck 19 and this bead can be ground off flush with the cap and neck as shown in Figure 11 to provide the finished valve head.

As shown in Figure 11, the finished valve 24 has a hollow stem 25, a hollow head 26 covered by a sheath 27 of the cap metal, and an outwardly flaring neck 28 between the stem and head partially covered by the underlapped portion of the sheath to provide the valve head seat 29. This valve head seat terminates at the weld area 30. All brazing material between the sheath and valve head is completely sealed by the weld area 30.

The hollow valve 24 has a coolant C such as metallic sodium therein. The nubbin 22a of the valve body 22 is swaged or extruded to form a closed end 25a on the stem 25 thus sealing the coolant C in the valve.

The hollow valve of Figure 11 can also be made by the process illustrated in Figures 8 to 10, wherein the cap 13 is mounted on the reduced head 11 of the billet 10 as shown in Figure 8 but the billet already has the groove 17 therein. The cap is then brazed to the grooved billet as shown in Figure 11 and the groove 17 is filled with the bead of welding material 23 as described in connection with Figure 7. The capped billet, after the brazing and welding operations, is next die pressed and extruded to provide the blank 18a of Figure 10. The blank 18a differs from the blank 18 in that the weld metal 23 is already in position. The valve body 22 of Figure 7 and the finished valve 25 of Figure 11 are then successively made from the blank 18a as described above.

Thus, according to the alternative processes defined above, the weld metal seal for the brazing material can be made either before or after the forging operation for producing a valve body from the solid metal billet.

In the embodiment shown in Figures 12 to 14 a solid poppet valve 40 is made in accordance with known forging processes to provide a valve stem 41 with an outwardly flaring end portion 42 providing a valve neck and a valve head 43. In accordance with this invention the valve head 43 is machined to provide an annular shoulder 14 around the under side thereof inwardly from the periphery of the head.

The machined valve head is then electroplated to deposit a film of brazing metal thereon. A cap 45 similar to the cap 13 described above is provided with a depending rim flange 45a terminating in a rim edge 45b. The cap 45 has the interior surfaces thereof covered with a film of electrodeposited brazing material of the same composition as the electrodeposited material on the head 43 of the valve. The cap 45 snugly fits over the head 43 of the valve with the rim 45a depending below the side of the valve head as shown in Figure 12.

If desired as explained above the brazing shim 14 can be used in place of the electroplated films.

The depending flange 45a of the cap is next spun into abutting engagement with the under side of the valve head as best shown in Figure 13 and the cap and head are heated in a non-oxidizing atmosphere as described above to melt the electrodeposited brazing films or the shim to effect a brazed bond 46 between the cap and head. The spun in portion 45a' of the cap terminates in spaced relation from the shoulder 44 of the valve head and thereby defines, with the shoulder, a groove for receiving the puddled-in weld material 47.

The projecting portion of the weld material 47 is next ground flush with the valve neck portion 42 as shown in Figure 14 to provide the finished valve. This valve has the head 43 thereof sheathed with the cap 45 and has a seat 48 defined by the cap metal. The exposed ground off weld metal provides a seal 49 for the brazing material, and extends around the neck portion 42 of the valve adjacent the valve seat 48.

The process of Figures 12 to 14 can also be used to make hollow valves and could be effected with the valve body 22.

Likewise solid sheathed valves 40 could be made from capped billets as described in connection with Figures 1 to 11.

From the above descriptions it will be understood that this invention now provides methods for making headed articles with integral thin metal sheaths covering the heads thereof and affixed to the heads by means of bonding metal which is sealed between the head and sheath with a puddled-in weld metal. The bonding metal increases heat conductivity away from the exposed valve head surface thereby minimizing burning of the valve in operation. The sheath metal extends over the peripheral edge of the head and underlaps the head to provide a seating surface therefor. The sheath metal is selected for its heat and corrosion-resistant properties while the metal making up the main body of the headed article is selected for strength and mechanical properties, enabling it to be forged.

I claim as my invention:

1. The method of making a poppet valve having a headed body portion composed of stress-resisting metal and a sheath covering the head of the body portion composed of corrosion and heat-resistant metal, which comprises brazing a cap of corrosion and heat-resistant metal onto an end face of a billet composed of stress-resisting metal, forging the capped billet to form a hollow valve blank having an outwardly flaring neck portion and a head portion covered with the cap, forging the resulting hollow blank to provide a valve body with a hollow head portion and a hollow stem portion having an enlarged nubbin end, inserting coolant material into the valve, and inwardly collapsing the nubbin end to seal the coolant material in the valve.

2. The method of making a poppet valve having a head clad with heat and corrosion-resistant metal which comprises brazing a cap of heat and corrosion-resistant metal to the end face of a solid cylindrical metal billet, forging the billet to provide a cup-shaped hollow blank having an enlarged headed end covered with said cap, forging the resulting hollow cup-shaped blank into poppet valve body form with a hollow head portion covered with the cap metal and an elongated hollow stem portion depending from the head portion, and puddling heat and corrosion-resistant metal around the head portion to integrally unite the periphery of the cap metal with the body metal.

3. The method of making poppet valves which comprises brazing a metal cap onto a reduced head portion of a metal billet, cutting a groove in the metal adjacent the exposed brazing material, forming the capped metal billet into headed poppet valve shape with the cap covering the head of the valve, and welding metal into the groove to cover and seal the brazing material.

4. The method of making poppet valves which comprises brazing a metal cap onto a metal billet, cutting a groove in the metal adjacent the exposed brazing material, working the capped and sealed billet at elevated temperatures into poppet valve shape thereby simultaneously improving the brazed bond, and puddling metal into the groove to seal the brazing material.

PAUL P. JOHNSON.

REFERENCES CITED

The following references are of record in the file of this patent:

UNITED STATES PATENTS

| Number | Name | Date |
|---|---|---|
| 1,218,317 | Rich | Mar. 6, 1917 |
| 1,826,542 | Hervig | Oct. 6, 1931 |
| 1,826,549 | Jardine | Oct. 6, 1931 |
| 1,848,063 | Wetherald | Mar. 1, 1932 |
| 1,889,916 | Colewell | Dec. 6, 1932 |
| 1,959,068 | Stoll | May 15, 1934 |
| 1,984,751 | McBride | Dec. 18, 1934 |
| 2,002,641 | McBride | May 28, 1935 |
| 2,052,862 | Armstrong | Sept. 1, 1936 |
| 2,089,749 | Jardine | Aug. 10, 1937 |
| 2,218,983 | Daisley | Oct. 22, 1940 |
| 2,300,850 | Wolcott | Nov. 3, 1942 |
| 2,354,947 | Colwell | Aug. 1, 1944 |
| 2,403,926 | Johnson | July 16, 1946 |

FOREIGN PATENTS

| Number | Country | Date |
|---|---|---|
| 803,927 | France | Oct. 12, 1936 |